(12) United States Patent
Bautista et al.

(10) Patent No.: US 10,655,390 B2
(45) Date of Patent: May 19, 2020

(54) DIGITALLY-ENHANCED TOOLS AND SYSTEM

(71) Applicants: David Bautista, Gilroy, CA (US); Salve Bigayan Bautista, Gilroy, CA (US)

(72) Inventors: David Bautista, Gilroy, CA (US); Salve Bigayan Bautista, Gilroy, CA (US)

( * ) Notice: Subject to any disclaimer, the term of this patent is extended or adjusted under 35 U.S.C. 154(b) by 0 days.

(21) Appl. No.: 16/272,351

(22) Filed: Feb. 11, 2019

(65) Prior Publication Data

US 2020/0032584 A1  Jan. 30, 2020

Related U.S. Application Data

(63) Continuation-in-part of application No. 16/044,853, filed on Jul. 25, 2018, now Pat. No. 10,260,282.

(51) Int. Cl.
| | |
|---|---|
| *E06C 7/00* | (2006.01) |
| *G08B 21/02* | (2006.01) |
| *G08B 7/06* | (2006.01) |
| *G07C 3/02* | (2006.01) |
| *H04W 4/029* | (2018.01) |
| *H04W 84/18* | (2009.01) |

(52) U.S. Cl.
CPC .............. *E06C 7/003* (2013.01); *G07C 3/02* (2013.01); *G08B 7/06* (2013.01); *G08B 21/02* (2013.01); *H04W 4/029* (2018.02); *H04W 84/18* (2013.01)

(58) Field of Classification Search
CPC ....... E06C 7/003; H04W 4/029; H04W 84/18; G07C 3/02; G08B 7/06; G08B 21/02
See application file for complete search history.

(56) References Cited

U.S. PATENT DOCUMENTS

| | | | | |
|---|---|---|---|---|
| 5,332,062 | A * | 7/1994 | Revere | E04G 1/34 182/118 |
| 5,853,065 | A * | 12/1998 | Hutson | E06C 7/003 182/18 |
| 5,954,154 | A * | 9/1999 | Ziolkowski | E06C 7/003 182/129 |
| 6,454,049 | B1 * | 9/2002 | Dorsett | E06C 7/12 182/102 |
| 9,256,906 | B2 | 2/2016 | Amigo et al. | |
| 9,711,028 | B1 * | 7/2017 | Friedman | G08B 21/0461 |
| 10,046,429 | B2 * | 8/2018 | Stock | B23Q 11/0082 |

(Continued)

*Primary Examiner* — Sisay Yacob
(74) *Attorney, Agent, or Firm* — Donald R. Boys; Central Coast Patent Agency LLC

(57) ABSTRACT

A tool use system has a tool having sensors tracking use of the tool, a first CPU executing first coded instructions monitoring input from the sensors with respect to time; and first wireless communication circuitry adapted to transmit data, and a central hub comprising a second CPU executing second coded instructions, a data repository, and second wireless communication circuitry compatible with the first wireless communication circuitry. The first coded instructions comprise an algorithm adapted to identify an instance of unsafe use of the tool based on sensory input and time, and wherein an identified instance of unsafe use is transmitted by the first wireless communication circuitry to the second wireless communication circuitry, and the second coded instructions cause the instance of unsafe use to be recorded in the data repository.

14 Claims, 12 Drawing Sheets

(56) References Cited

U.S. PATENT DOCUMENTS

| | | | |
|---|---|---|---|
| 10,489,988 B2* | 11/2019 | Russ | G01H 11/08 |
| 2003/0020622 A1* | 1/2003 | Ching-Yao | E06C 7/003 |
| | | | 340/665 |
| 2006/0032704 A1* | 2/2006 | Chandra | E06C 7/003 |
| | | | 182/18 |
| 2011/0148645 A1* | 6/2011 | Sarmiento | E06C 1/18 |
| | | | 340/665 |
| 2013/0113617 A1* | 5/2013 | Wang | E06C 7/003 |
| | | | 340/521 |
| 2013/0246070 A1* | 9/2013 | Olson | B65D 55/028 |
| | | | 704/274 |
| 2015/0027808 A1* | 1/2015 | Baillargeon | B66F 17/006 |
| | | | 182/3 |
| 2017/0173749 A1* | 6/2017 | Stock | B23Q 11/0082 |
| 2018/0068493 A1* | 3/2018 | Russ | G01H 15/00 |

* cited by examiner

Section AA

DIGITALLY-ENHANCED TOOLS AND SYSTEM

CROSS-REFERENCE TO RELATED DOCUMENTS

The present application is continuation-in-part (CIP) of co-pending application Ser. No. 16/044,853, filed on Jul. 25, 2018. All disclosure of the prior application is incorporated herein at least by reference.

BACKGROUND OF THE INVENTION

1. Field of the Invention

The present invention is in the field of construction, more particularly, to implements such as a ladder or a stepladder/stool implement for enabling access to a work space and pertains particularly to methods and apparatus for notifying a user of one or more unsafe states or unsafe use.

2. Discussion of the State of the Art

In the art of construction, there are a variety of simple mechanical implements that enable a construction worker to access a work space that otherwise would be out of reach to the worker. One of the most common of these implements is a ladder. There are many types of ladder in the art including a stepladder, an extension ladder, and shorter ladder type stools or step-stool devices.

There may be a variety of potential dangers present when a ladder is employed to reach a work space. Potential dangers inherent with ladder use may include improper or incomplete fold-out for a stepladder, that is, deployment, incorrect extension locking of an extension ladder, placing a ladder on unequal ground supporting the ladder, too much weight on a ladder rung, improper angle of the ladder against a vertical wall, or improper traverse of the ladder such as by stepping on the top rung or the folding platform reserved for paint and tool placement. Some of these potential dangers are also inherent in shorter ladder-like stools that may fold out like a stepladder. Some of these potential dangers may also be inherent in elevated platform scaffolds and in hanging scaffolds.

Manufacturers have mitigated these potential dangers to some extent by making workers aware by such as safety-use stickers placed at strategic places on the ladder or other product and writing safety clauses into user manuals associated with the product. However, there are still many accidents that occur through a worker overlooking caution while using the products. Further to the above, there are many other sorts of tools that may be dangerous to a user if used improperly.

Therefore, what is clearly needed in the art is an intelligent system for tools that may be used in an unsafe manner, that will issue alerts and record unsafe use in a variety of ways.

BRIEF SUMMARY OF THE INVENTION

In an embodiment of the invention a tool use system is provided, comprising a tool having sensors tracking use of the tool, a first CPU executing first coded instructions monitoring input from the sensors with respect to time; and first wireless communication circuitry adapted to transmit data, and a central hub comprising a second CPU executing second coded instructions, a data repository, and second wireless communication circuitry compatible with the first wireless communication circuitry. The first coded instructions comprise an algorithm adapted to identify an instance of unsafe use of the tool based on sensory input and time, and wherein an identified instance of unsafe use is transmitted by the first wireless communication circuitry to the second wireless communication circuitry, and the second coded instructions cause the instance of unsafe use to be recorded in the data repository.

In one embodiment of the invention the tool comprises an ID number stored at the tool, and the ID number and a time stamp are associated with the instance of unsafe use. Also, in one embodiment the tool is associated digitally at the central hub with a specific user, and the instance of unsafe use is recorded in the data repository associated digitally with the specific user. In one embodiment the first and second wireless communication circuitry operate on compatible Bluetooth™ protocol. And in one embodiment, upon identifying an instance of unsafe use, an alert is issued at one or both of the tool and the central hub.

In one embodiment of the invention the second wireless communication circuitry comprises a modem creating a WiFi local network, and wherein the first wireless communication circuitry accesses the WiFi network. Also, in one the first wireless communication circuitry comprises access to a cellular network, and wherein the central hub is an Internet connected server system. Also, in one embodiment the tool has an IP Address stored at the tool, and the tool is accessible on the Internet through the IP address. In one embodiment the tool further comprises GPS circuitry wherein GPS location is transmitted by the first wireless communication circuitry. And in one embodiment the central hub further comprises a keyboard and a display screen with supporting circuitry, providing access by an authorized person to data stored in the data repository. In another embodiment the authorized person is enabled through the second coded instructions to create and edit files and associations in the data repository.

In another aspect of the invention a tool use system is provided, comprising a tool having sensors tracking use of the tool, a first CPU executing first coded instructions monitoring input from the sensors with respect to time; wireless communication circuitry, a first data repository, and an IP address stored at the tool, and an Internet-connected domain comprising a second CPU executing second coded instructions, and a second data repository. The Internet-connected domain establishes communication with the tool and accesses data stored in the first data repository.

In one embodiment the first coded instructions comprise an algorithm adapted to identify an instance of unsafe use of the tool based on sensory input and time, and an identified instance of unsafe use is recorded in the first data repository, and the data accessed by the Internet-connected domain comprises the stored instance of unsafe use. In one embodiment the system comprises a plurality of tools each comprising sensors tracking use of the tool, a first CPU executing first coded instructions monitoring input from the sensors with respect to time; wireless communication circuitry, a first data repository, and an IP address stored at the tool, wherein each of the plurality of tools has a unique IP address identifying the specific tool, and a host of the Internet-connected domain is enabled to track unsafe use of each of the tools.

BRIEF DESCRIPTION OF THE DRAWING FIGURES

DETAILED DESCRIPTION

The inventor provides a unique safety alert system for use in alerting a user operating a ladder or other work positioning construction platform or step structure of improper use of the structure and of potential unsafe states of the structure. The present invention will be described in enabling detail using the following examples, which may describe more than one relevant embodiment falling within the scope of the present invention.

Figure 1:
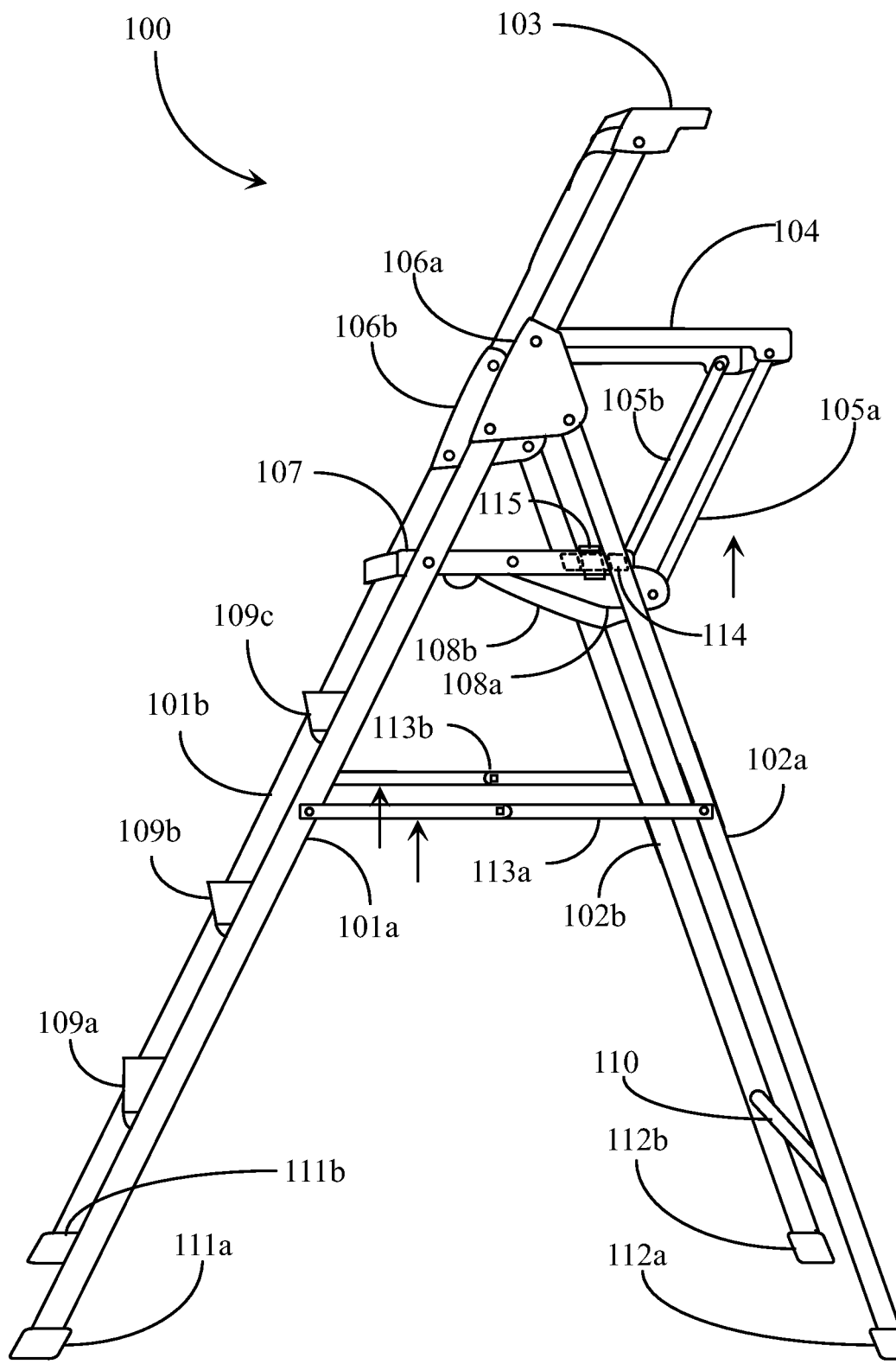
FIG. 1 is a side-perspective view of a fold-out stepladder depicting ladder components that may be adapted with electronic sensors and a ladder use safety alert system according to an embodiment of the present invention.

FIG. 1 is a right side-perspective view of a foldout stepladder 100 depicting ladder components that may be adapted with electronic sensors and a ladder use safety alert system according to an embodiment of the present invention. Stepladder 100 represents just one style of a foldout stepladder. For the purposes of discussion, there are many different styles of foldout stepladders, including long basic structures used for reaching ceilings, tree tops, and shorter more complex structures for use in performing work such as painting. Such apparatus may include platforms for placing paint and tool trays for holding or staging tools.

The term foldout ladder may refer to any foldout step apparatus including stools that may be leveraged by a user to gain height off of ground level when performing a task. It should be noted herein as well that the ladder use safety alert system of the invention is not limited to foldout style ladders and stools, but may also be integrated with extension ladders, scaffolding, and fixed rung ladders and such without departing from the spirit and scope of the present invention.

The inventor chooses a foldout stepladder such as stepladder 100 as an example structure. Foldout stepladder 100 may also be referred to herein as a stepladder 100 or ladder 100. Ladder 100 has a set of front ladder rails 101a (right rail) and 101b (left rail). Front ladder rails 101a and 101b are climbing rails framing ladder steps 109a, 109b, and 109c. Steps 109a-c may be cross-bolted to the rail set. A rail cap brace 103 is provided to secure together the top end of rails 101a and 101b.

Stepladder 100 includes a set of rear support rails 102a (right support rail) and rail 102b (left support rail). Support rails 102a and 102b are fastened together by a cross rail 110 (lower portion) and by a latch rail 114. Rear rails 102a and 102b are, as a fixed set, rotatably pinned to a right pivot housing 106a and a left pivot housing 106b. Pivot housings 106a and 106b are fixedly mounted to rails 101a and 101b respectively. Stepladder 100 includes a spreader linkage 113a (right spreader) and a spreader linkage 113b (left spreader).

Spreader linkages 113a and 113b are not required to enable the functions of stepladder 100 but are included in this depiction as the most common stabilization system for a basic stepladder with no latching platform. Ladder 100 comprises a latching platform 107 rotatably pinned in the rear to rails 102a and 102b. Latch platform 107 latches over a cross brace 114 to lock and stabilize stepladder 100 in deployed position. Latch platform 107 includes a user operable hook latch 115, which hooks over cross brace 114 to secure the ladder in full fold-out position and ready for use.

Ladder 100 further comprises in this example a tool platform 104 to place work tools, pain buckets, or other materials or tools required at close hand. Tool platform 104 is rotatably pinned at the rear to the top portion of pivot housings 106a and 106b. Tool platform 104 is a tandem platform to latch platform 107 and is connected to the front portion of the latch platform, more particularly, to a right flange 108a and a left flange 108b extending from beneath the platform by pair of links 105a (right link) and 105b (left link). When the ladder is opened from a folded position platform 104 and platform 107 move in tandem due to links 105a and 105b.

Ladder 100 in this example comprises four safety boots installed at the rail ends including rail safety boot 111a (right front), rail safety boot 111b (left front), rail safety boot 112a (right rear) and rail safety boot 112b (left rear). Safety boots provide base stabilization for the ladder when the ladder is deployed.

A user operating stepladder 100 must urge spreader linkages 113a and 113b upward in the direction of the arrows, disjointing them, and also release latch platform 107 from latch bar 114 by lifting latch 115. To fold stepladder 100 into a folded position for stowing, platform 107 and platform 104 pivot upward in tandem and fold in line with the ladder rails. A latch and handle (not illustrated) may be provided to latch the ladder in a folded position.

In general, there are well known safety rules for using a stepladder. Certain parts of the ladder are safe to stand on while other parts are not. For example, a user may safely stand on each ladder step, such as steps 109a, 109b, and 109c one step at a time but may not safely stand on platform 104, or on cap brace 103. It may also be recommended that a user place the ladder on level ground, such that all four safety boots have contact with the ground, and the ladder does not rock back and forth leaving one boot off the ground.

Ladders having a tool tray or platform such as platform 104 may specify a maximum weight that may be safely placed on the extended platform.

In general, and with all ladders and similar work-positioning apparatus such as scaffolding, there may be other points of safety that might differ from those of a stepladder such as ladder 100. An extension ladder or a fixed rail ladder should not be used with one arm free or with both arms free and not holding onto the rails. An extension ladder or fixed ladder requires deployment at a safe nominal angle. If the lean angle of the ladder is too small from vertical the ladder could fall backward with the weight of a user. If the lean angle of the ladder is too large from vertical, the legs may slip out from their original position under a user's weight.

In one embodiment of the invention, ladder 100 may be adapted with electronic sensors and circuitry and at least one form of visual or audible output to alert a user if the user is operating the ladder in an unsafe manner. The inventor provides a ladder-use safety alert system that may be customized to fit an existing stepladder such as step unit (CPU) and distributed sensors. Sensors may include contact sensors, pressure/weight sensors and proximity sensors strategically placed on relevant parts of ladder 100. Data collected from the sensors may be processed to create output signals, to such as, for example, a light emitting diode (LED) panel and or to a sound amplifier and speaker or speaker set.

Figure 2:
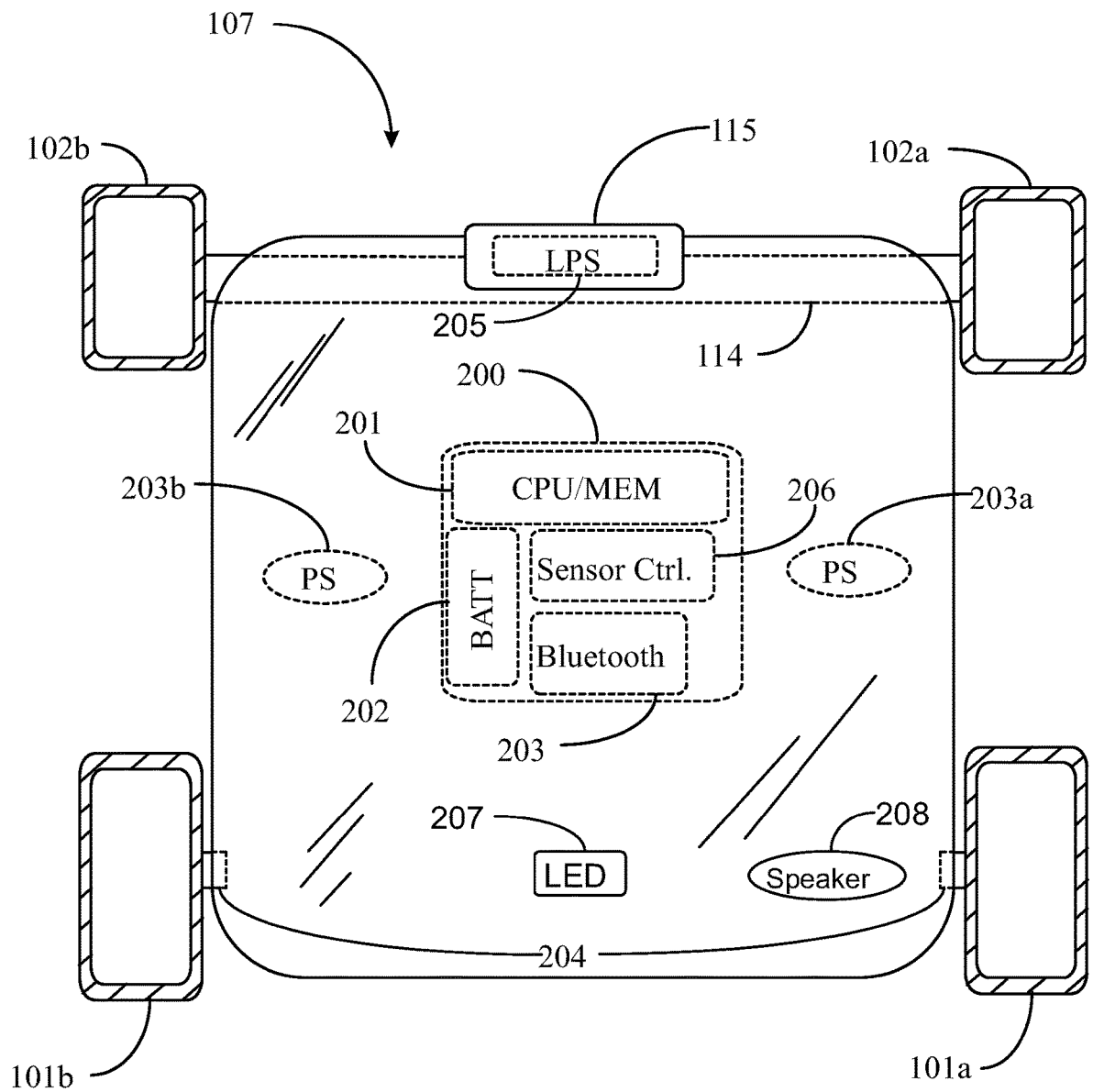
FIG. 2 is an overhead view of a latch cross-platform of the stepladder of FIG. 1 depicting electronic components of a ladder use safety alert system according to an embodiment of the invention.

FIG. 2 is an overhead view of latch cross-platform 107 of stepladder 100 of FIG. 1 depicting electronic components according to an embodiment of the invention. In this view, platform 107 is rotatably pinned to the front rails 101a and 101b by pins 204. Platform 107 latches down over cross rail 114 and locks down, requiring the user to lift up on latch handle 115 to unlock the platform from the cross rail. The surface of platform 107 may support the weight of a user, dependent upon load support capability of rail 114 and pin connections 204. However, it may be recommended that a user not stand on the surface of platform 107 because it is too high up on the ladder profile.

In one embodiment the ladder use safety alert system includes a CPU and several distributed sensors that operate to provide alerts users of potential safety use violation or of a potential hazard. Platform 107 may include an electronics housing compartment 200 adapted to house electronic components of the ladder use safety alert system. Compartment 200 may be accessible from underneath platform 107. Such a housing unit may be bolted onto the underside of platform 107 using conventional fastening hardware.

Compartment 200 may house CPU 201 having a small amount of digital memory (MEM) for storing or caching data. CPU 201 may be a small microcontroller. Compartment 200 may house a rechargeable battery 202 for providing power to the CPU such as a nine-volt battery for example. In some embodiments, there may be a requirement for a larger battery and in others a battery source lower than 9 volts might be sufficient. This may depend in part on the actual structure being fitted and the nature and capability of the electronic components. It may be noted herein that an on/off switch (not illustrated) may be provided to boot CPU 201 and the rest of the components and sensors comprising the ladder use safety alert system. In some embodiments there may be a sensor or switch positioned to turn off the alert system when the ladder is folded, and turn the system on as the ladder is deployed Compartment 200 may house a wireless transceiver 203 capable of receiving and transferring data over a short-range wireless network such as Bluetooth network. Transceiver 203 is not required to practice the invention as, as electronic components in some embodiments may communicate instead through physical electrical conductors, such as wires and cables, connected between distributed sensors and the main unit operating visual and audio components. Such data busses, including power lines, may be provided through external placement of the data paths on exterior surfaces of target ladder components.

In a wireless embodiment relative to sensor distribution and communication, sensors may communicate data wirelessly to a sensor controller (Ctrl) 206. Sensor controller 206 may be adapted to isolate and identify a sensor input signal (trigger) and may present the signal to an appropriate the CPU to generate an output signal that might be used to provide a visual signal and/or audio signal to alert of improper use. In one embodiment, a visual and or audio signal confirming proper use may also be generated.

Platform 107 may comprise one or more sensors, such as a pressure sensor (PS) 203a and a pressure sensor 203b provided strategically on or just below the platform surface. In one embodiment, pressure sensors 203a and 203b are equipped with transmit capability via wireless network like Bluetooth and can communicate wirelessly to the CPU. It may be noted herein that Bluetooth-enabled sensors may have their own power source such as a small rechargeable battery.

In one embodiment, sensors are distributed and are connected by power and data lines to the CPU. For example, a sensor may be a universal serial bus (USB) connected peripheral device. Power and data return lines to a sensor may be applied on the surface of the component the sensor is relative to and may be secured under tape or supplied in a cover piece adapted to fit over the part hosting one or more sensors.

Pressure sensors 203a and 203b may be calibrated to detect pressure contact and to measure the amount of force or weight against the surface of platform 107 that is exerted. Although platform 107 may be strong enough to support the weight of a user, it may not be desired that a user stands on platform 107 because it is too high up for safe use. If a user attempts to stand on platform 107, sensors 203a and 203b report the total force and CPU 201 may cause a visual and or audio signal that may alert the operator and others. However, a certain maximum amount of force may be tolerated such as for placing tools or materials on the platform.

Platform 107 includes a light emitting diode (LED) 207 mounted onto the surface of the platform. LED 207 may be capable of emitting different colors of light. For example, LED 207 may be green if current pressure on platform 107 is between set limits and is not unsafe. LED 207 may flash red if current force or weight against the platform exceeds a safe amount. LED 207 may flash amber if the weight on the platform is not ideal but not unsafe to alert the operator that caution may be advised. In one implementation there are separate LEDs of each color light.

Platform 107 in this example includes a speaker 208 and associated audio circuitry and amplifier. Speaker 208 may be selected for audio output of an alarm sound that may indicate to a user that unsafe use or a potential hazard exists. Speaker 208 may sound if sensors 203a and 203b report force that exceeds a safe level. It is noted that readings may be taken in fast cycles or refresh intervals. Speaker 208 may continue an alert signal continually until the sensors no longer detect the excess force.

Platform 107 in this example is a latch platform operated by latch 115. Latch 115 may include a latch position sensor (LPS) 205. LPS 205 in one embodiment senses latch position and determines whether latch 115 is completely closed. If latch 115 is closed then LED 207 may flash green, if not then LED 207 may flash red to alert an operator. Speaker 208 emit a warning sound if the system is powered on and latch 115 is not completely closed during operation.

In one embodiment audio signals may be transferred to a Bluetooth-enabled ear piece worn by the operator. Warning sounds may be received by the operator if latch 115 is open or too much force is being applied to the top surface of platform 107. In one embodiment conductive tape may be provided to connect remote sensors to CPU 201 and the rest of the components. In one embodiment a capacitive contact strip switch known to the inventor may be employed in the architecture such that different sensors may be powered on from an off state when the operator is stepping on or otherwise interacting with different parts of the stepladder. in one embodiment depicting additional electronic components of the ladder use safety alert system. Platform 104 is a tandem platform to platform 107 such that when platform 107 is unlatched and folded upward platform 104 folds up in tandem due to connecting rotatable links 105a and 105b. Platform 104 cannot hold the weight of a user and is a no-climb platform. Platform 104 may support the weight of a bucket of paint and associated tools and materials that might be placed on the platform.

In this embodiment, platform 104 includes a general area weight sensor 302. Weight sensor 302 may be a single sensor or an array of sensors without departing from the spirit and scope of the invention. Weight sensor 302 is adapted to monitor the total weight of any objects placed within the circular boundary, such as a can of paint, for example. If an operator climbs onto platform 104 weight sensor 302 may detect weight past a calibrated maximum weight causing the sensor to report to the CPU and associated components as shown in FIG. 1, platform 104 is the top platform. Sensor 302 may, in one embodiment, include Bluetooth circuitry and a separate power source that may be switched on when platform 104 is raised or when an object is first placed onto the platform. In another embodiment, a conductor from BATT 202 of FIG. 2 is provided and routed from the CPU compartment 200 of FIG. 2 down one of front rails 101a or 101b and to sensor 302.

Figure 3:
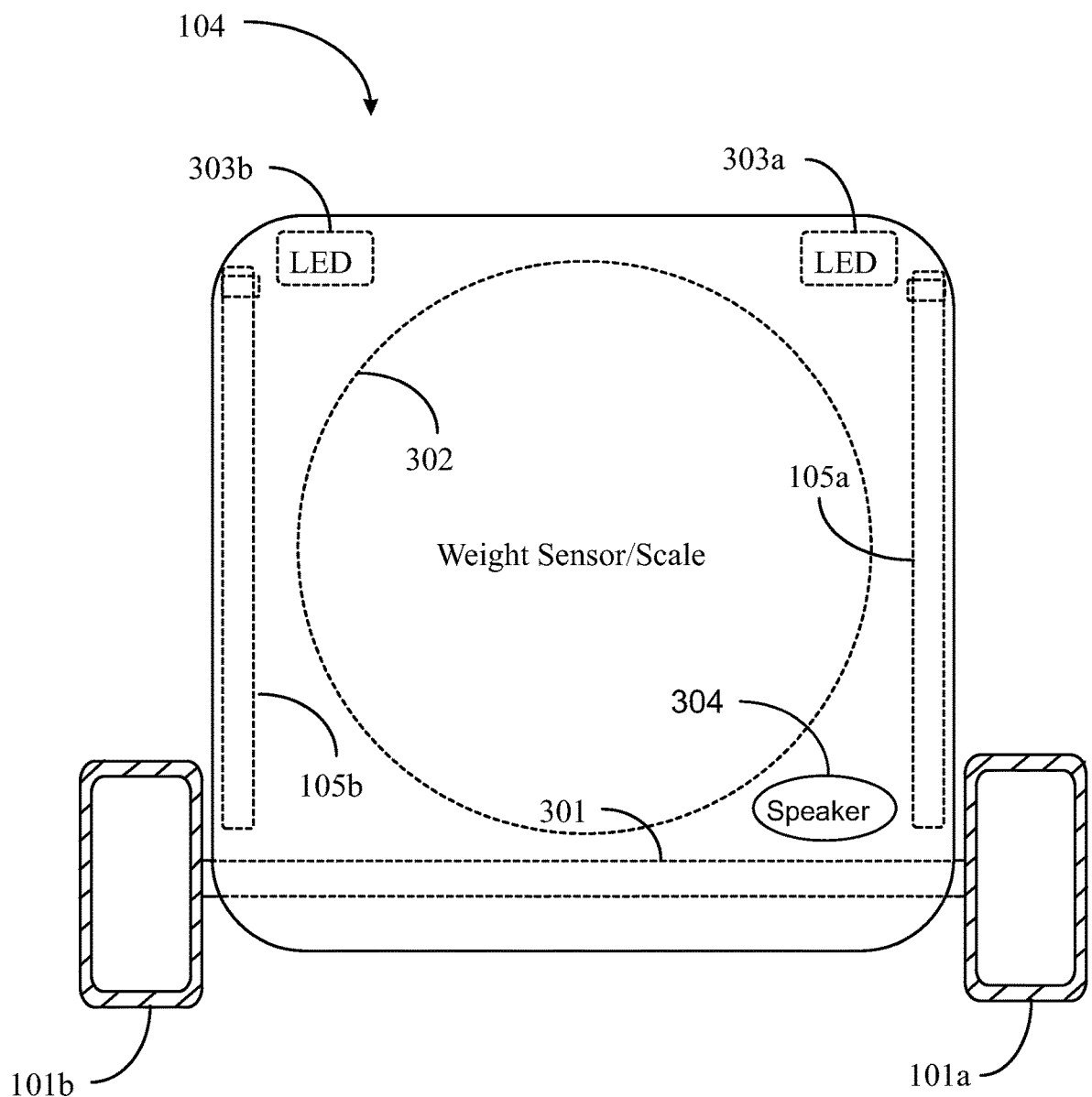
FIG. 3 is an overhead view of a fold-out tool platform of the stepladder of FIG. 1 depicting electronic components of a ladder use safety alert system according to an embodiment of the invention.

Referring to FIG. 3, an LED 303a and an LED 303b are shown. LED 303a may flash or glow green while LED 303b may flash or glow red. LEDs 303a and 303b may be wired for power to CPU unit 202 as described above. A speaker 304 may be provided on platform 104 and may be wired to CPU 201 for power and signal. It is noted herein that speakers may also be Bluetooth devices having separate batteries or may be wired to the main battery 202 of FIG. 2.

In one embodiment when power to the system is on, weight sensor 302 registers weight against the top surface of platform 104. If the weight detected is below a threshold, LED 303b may flash green, indicating a confirmation to the operator of proper use. If the weight detected is above a calibrated maximum, then LED 303a may flash red indicating a hazardous condition on platform 104. Speaker 209 may be used in tandem to output an alarm sound or vibration. In one embodiment, the speaker may be a Bluetooth device that may receive an audio alert sound or vibration from Bluetooth module 203 of FIG. 2. In another embodiment, speaker 209 is not provided and Bluetooth module 202 of FIG. 2 may transmit an alert to a Bluetooth ear piece worn by the operator.

In one embodiment, platform 104 may include a small micro-controller and power source, where the local micro controller includes a small amount of memory and manages local sensor 302, LEDs 303a, and 303b, and speaker 304. In this way, the components of the ladder use safety alert system may be distributed through the ladder architecture as autonomous groups of sensors, warning lights, and speakers. In one embodiment, the electronics described above relative to platform 104 may be provided enclosed in or encased in a platform cover device that may be fitted over the platform. In one embodiment, placing an object on top of platform 104 initiates the electronics on the platform and the object or objects are weighed and compared against a threshold. LEDs and an audio alert signal may be initiated upon comparison of sensed weight. LEDs may flash accordingly, and an audio alert sound signal may be generated through a speaker or over Bluetooth to an operator ear piece.

Figure 4:
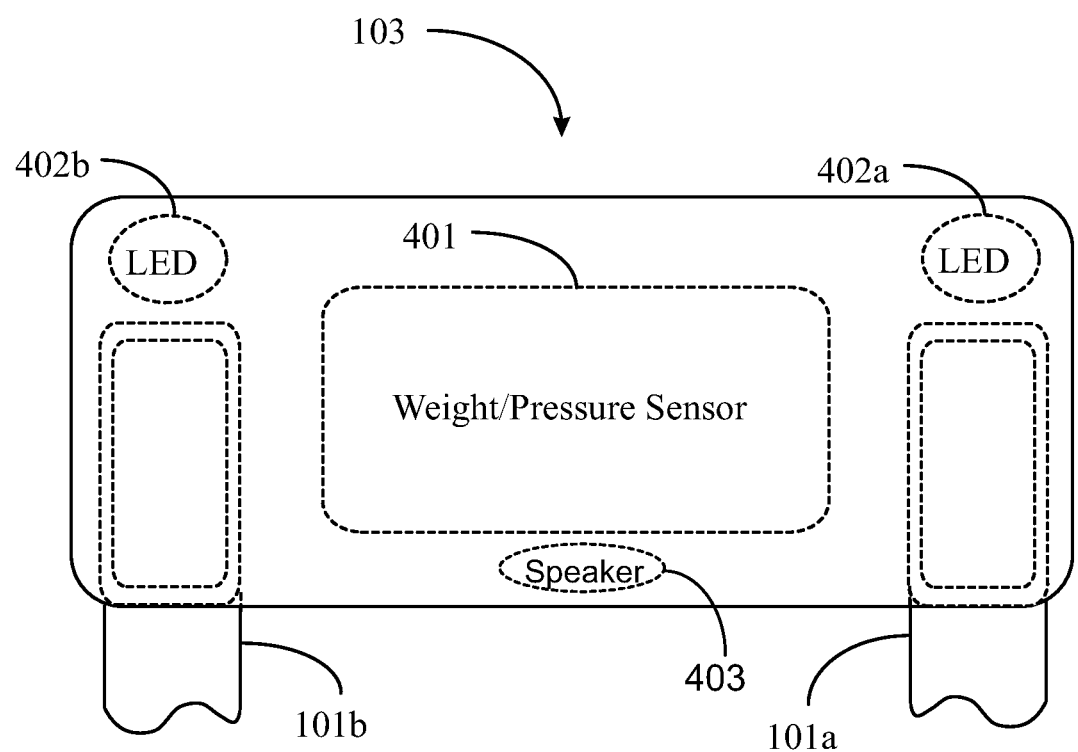
FIG. 4 is an overhead view of a ladder cap rung depicting electronic components of the ladder use safety alert system of the invention.

FIG. 4 is an overhead view of cap brace 103 of FIG. 1 depicting additional electronic components of the ladder use safety alert system of the invention. Ladder cap 103 is mounted over the ends of climbing rails 101a and 101b of FIG. 1 and is the highest point of the ladder structure and is a no-climb surface. A pressure sensor 401 may be provided on the central top surface of ladder cap brace 103 to detect force exerted on the surface of the cap brace.

In one embodiment weight sensor 401 may be applied as a device encased in polymer that may be adhered directly to the top surface of cap brace 103. In one embodiment, electrical conductors may be routed from CPU unit 201 of FIG. 2 up climbing rail 101a or 101b to cap brace 103 to power the sensor. Weight sensor 401 may be calibrated with a maximum sustained weight threshold value. If an operator matches or exceeds the value by stepping onto the surface of the cap brace, the weight sensor would detect a force past maximum and an alert signal may be sent to an LED 402a and LED 402a may flash red alerting the user visually. A speaker 403 may be provided to alert the operator by amplified sound or buzz of the excessive force detected by the sensor. LED 402b may flash green if cap brace 103 is not overloaded while power is on. For example, an operator may set tools or materials on the cap that may be detected and weighed by sensor 401, wherein the sustained weight is less than the threshold.

In one embodiment weight sensor 401 is Bluetooth-enabled and may communicate results to CPU 201 of FIG. 2, more particularly to the Bluetooth module for transmission to a Bluetooth-enabled ear piece worn by the operator. In this case speaker 403 may not be required as the sound alert is received by the operator through the ear piece. In one embodiment, a contact sensor (not illustrated) in the form of an electronic adhesive strip might be provided that may be applied about the top surface edges of ladder cap 103. A contact sensor tape may be powered, and the sensor may detect slight contact such as hand contact made by an operator. Detection of light contact may function as a trigger for waking up weight sensor 401.

Figure 5:
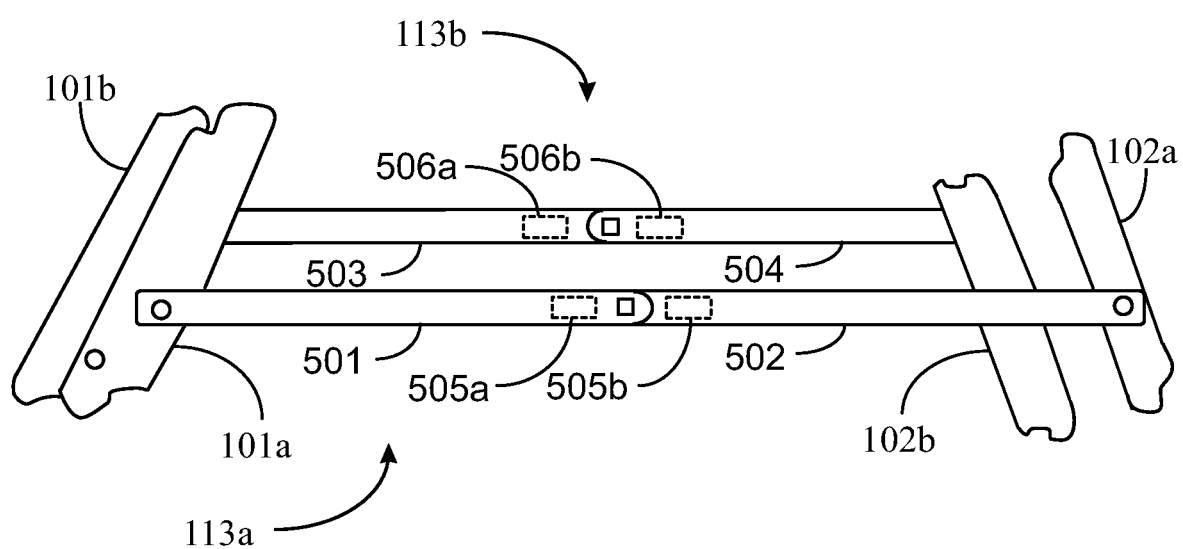
FIG. 5 is a partial view of spreader joints of the stepladder of FIG. 1 depicting electronic components of the ladder use safety alert system of the invention.

FIG. 5 is a partial view of the spreaders 113a and 113b of stepladder 100 of FIG. 1 depicting electronic components of the ladder use safety alert system of the invention. Spreaders 113a and 113b in one embodiment comprise jointed sections 501 and 502 (spreader 113a) and jointed sections 503 and 504 (spreader 113b). Spreaders 113a and 113b may lock in when horizontal to help stabilize the ladder base and prevent the ladder from folding back up unintentionally. Position sensors 505a and 505b may be provided near the pinned ends of joint section 501 and joint section 502 respectively. Spreader 113b includes position sensor 506a on joint section 503 and position sensor 506b on joint section 504.

Position sensors 505a, 505b, 506a, and 506b may be powered via conductors from battery 202 of FIG. 2 down one or both climbing rails 101a. Each pair of position sensors may report relative alignment and position relative to horizontal alignment between the two paired sensors. If spreader 113a is urged down all the way, then position sensors 505a and 505b may report as a pair of aligned sensors. Likewise. Sensors 506a and 506b report alignment when spreader 113b is urged down. Speakers might also be provided on spreaders 113a and 113b as well as LEDs though none are illustrated here. In one embodiment, each pair of position sensors 505a and 505b and 506a and 506b include Bluetooth circuitry for transmitting a signal to CPU 201 of FIG. 2, which may be transmitted to a Bluetooth enabled earpiece worn by an operator.

In one embodiment, LEDs may be provided on a part of the ladder that is more visible to an operating user such as on the face of climbing rails 101a and 101b. In one embodiment, a contact sensor strip may be provided to cover the vertical edges of the climbing rails 101a and 101b. Such a strip may be used to ensure proper climbing by alerting if an operator is not properly traversing up the stepladder while holding onto the vertical climbing rails. In general, adding sensor reporting technology to a spreader enables alert status of current state of the spreader whether locked or articulated.

Referring again to FIG. 1, stepladder 100 includes a bottom ladder step 109a followed by two more steps referenced in FIG. 1 as step 109b and step 109c. There may be fewer or more steps depending upon design. Steps 109a through 109c are adapted to bear the weight of a human operator. One aspect of safety for traversing ladder steps is that each step is traversed sequentially, and no steps are skipped. Another safety issue for traversing ladder steps is that an operator ascending a step places both feet on the step before ascending the next step. Deviation from these safety aspects may lead to a fall and injury. Therefore, steps 109a through 109c may include one or more contact sensors adapted to detect a human operator making contact with the top surface of the step.

Figure 6:
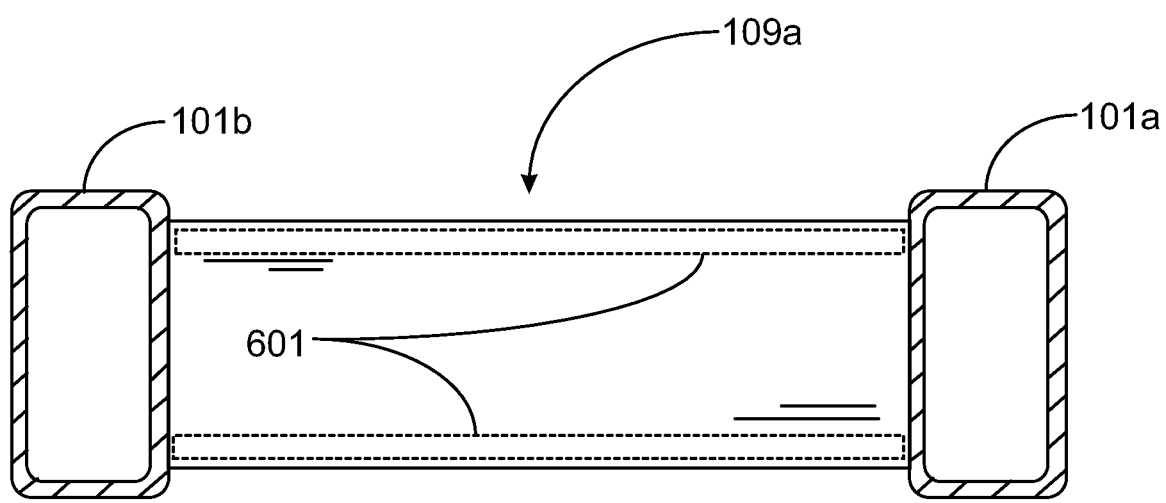
FIG. 6 is an overhead view of the stepladder of FIG. 1 depicting electronic components of the ladder use safety alert system of the invention.

FIG. 6 is an overhead view of ladder step 109a of FIG. 1 showing additional electronic components of the ladder use safety alert system of the invention. Ladder step 109a may include edge contact sensor strips 601 disposed at one or at both long edges of the ladder step. It is important that an operator traverse each ladder step sequentially when ascending or descending the ladder. Contact sensors 601 may detect contact from the operator's foot and report same to CPU 201 of FIG. 2. Contact sensors on the next step 109b and the following step 109c do the same. CPU 201 aided by firmware or SW instruction may analyze the contacts and determine if an operator is properly ascending or descending the ladder.

Contact sensors 601 may be powered by conductors routed from the CPU down one or both climbing rails 101a and 101b. In one embodiment, contact sensor data is analyzed by CPU 201 of FIG. 2, and if a step was skipped ascending or descending an audio alert may be generated and sent to an ear piece worn by the operator through a Bluetooth connection. In one embodiment, audio recordings may be created and stored in memory on the CPU where the recording may be selected and transmitted to an operator over Bluetooth. A recording reminding the operator to use each step sequentially may be created and played on the operator's ear piece device.

In one embodiment, a capacitive tape switch may be employed in addition to one or more contact sensors wherein an operator steps on the first step tape switch completing a circuit that wakes up the contact sensors 601 to operate if the tape switch is closed completing the circuit. When the operator moves from the first step to a second step, the switch tape on the second step is depressed forming a circuit to wake up the contact sensors on that step and so on. With no pressure on the tape switch the circuit breaks again and the sensors are off saving power.

Referring again to FIG. 1, stepladder 100 includes feet 111a and 111b capping the ends of the climbing rails, and safety feet 112a and 112b capping the support rails. It is important that each foot is in constant contact with a ground surface during operation for stability. Uneven ground may create a situation where one or more feet of the ladder are not making stable contact with the ground. Ground contact sensors may be provided and located at the bottoms of the ladder safety feet and may be connected for power to CPU 201 of FIG. 2 through conductors routed from the CPU down the climbing and support rails to the sensor in the feet.

Figure 7:
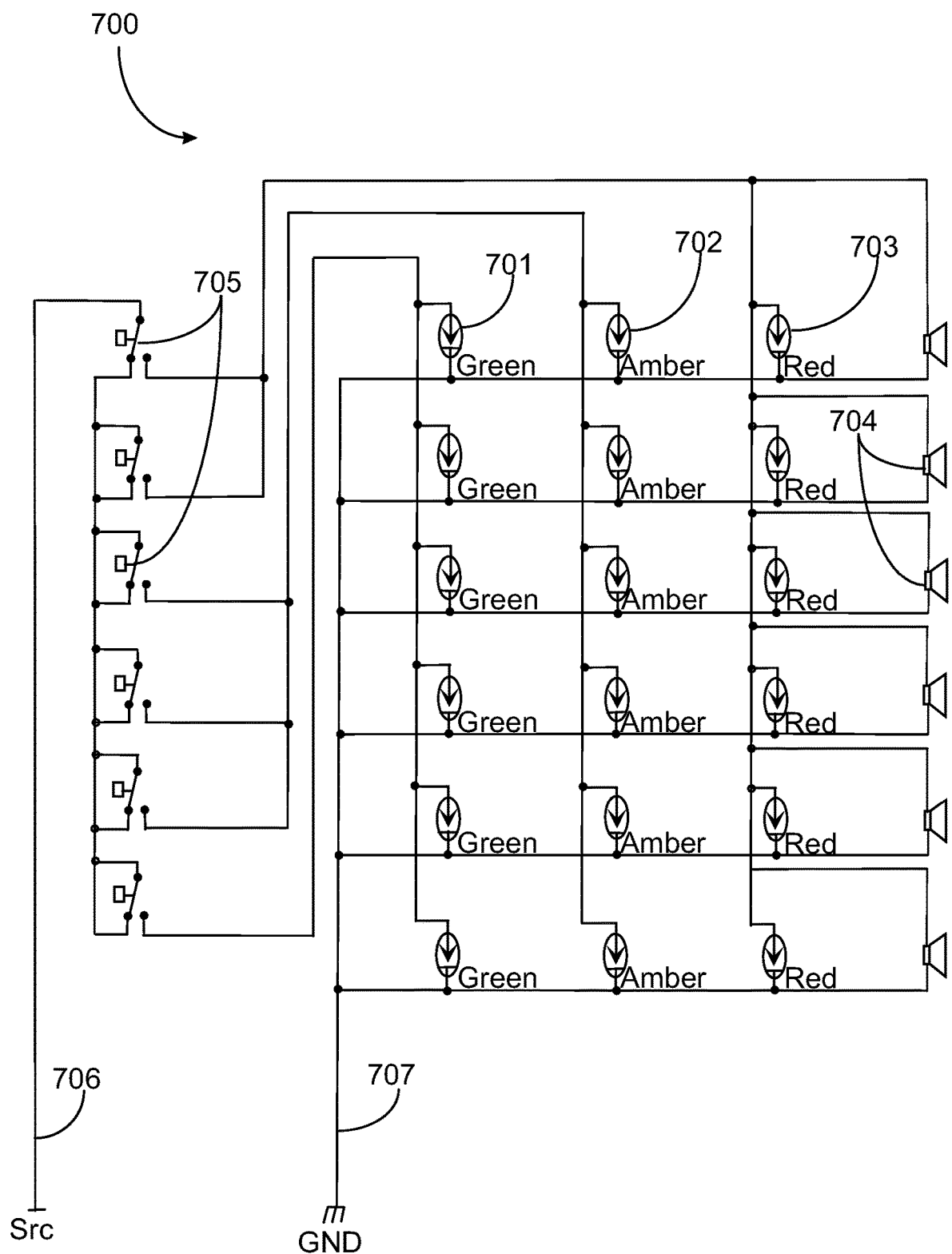
FIG. 7 is an exemplary circuit diagram, depicting distributed electronic light and sound circuitry for producing visible alerts and audible alerts in response to a user operating the ladder of FIG. 1 in an embodiment of the invention.

FIG. 7 is an exemplary circuit diagram 700, depicting distributed electronic light and sound circuitry for producing visible alerts and audible alerts in response to a user operating the ladder of FIG. 1 adapted to practice the invention. Circuit diagram 700 represents a wired circuitry that may be electronically manipulated to selectively activate status lights such as LEDs 701 (green), 702 (amber), and 703 (red). It may be assumed herein that if three different lighting colors are employed and they are green (701), amber (702), and red (703), then green may indicate normal state (no improper use or hazard). Amber may indicate a caution state (no improper use but a potential hazard). Red may be assumed an alert state prompting audio intervention (improper use and potential hazard).

Diagram 700 represents a circuitry that may be distributed throughout the stepladder architecture from the top most cap brace to the bottom most step wherein switch circuits 705 connect the lighting circuitry to a power source (Src) 706. LED lighting circuits that are dedicated red may also connect to speakers 704 adapted to output an audio alert sound or vibration. It is noted herein that for every deck of lights and a speaker, there is a power switch to source power (chargeable battery) analogous to battery 202 of FIG. 2.

It will be apparent to one with skill in the art of LED circuits that an LED may be capable of displaying more than one color of light in separate modes. It will also be apparent that there may be as few as a single LED with two light color modes in place of three LEDs each dedicated to a single light color. In one embodiment, sensors and speakers may be adhesive-backed components that may be placed on a desired surface of the ladder. Further the sensors may be connected for power using electrical conductors having at least a power and ground line. In such an embodiment, the system may be packaged as custom kits that may be used on a variety of ladder or step-stool type apparatus.

Figure 8A:
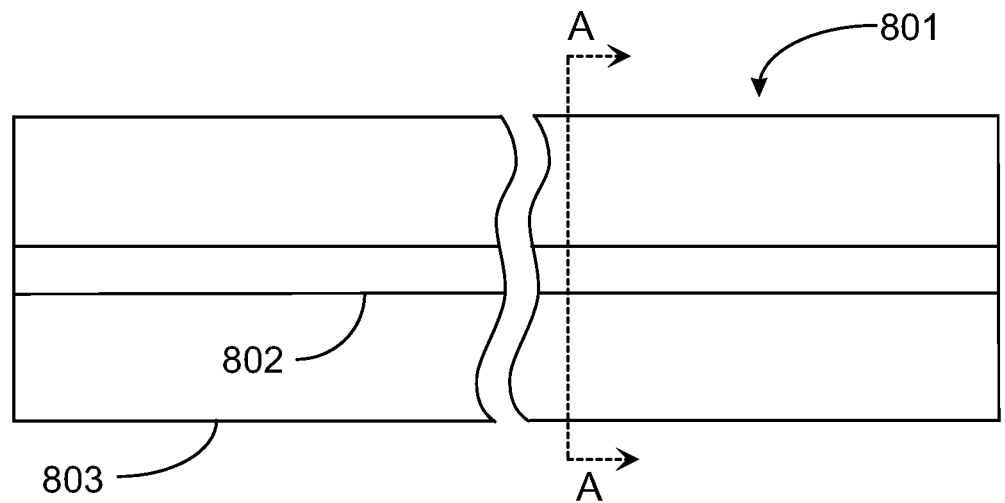
FIG. 8A is an overhead view of a commercially-available switch/sensor tape that may be used to provide selective power and sensor activation to one or more parts of the stepladder of FIG. 1.

FIG. 8A is an overhead view of a commercially available switch/sensor tape 801 that may be used to provide selective power and sensor activation to one or more parts of the stepladder of FIG. 1. Switch tape 801 may be a normally open contact switch where a capacitance must be breached for the contact switch to turn on delivering power to LEDs and sensors. The apparatus may be a molded strip 803 with an adhesive back, molded strip 803 encasing the electronics contact plates separated by at least one insulative layer. In this embodiment, a raised bead 802 is provided at longitudinal center of molded strip 803. Bead 802 functions as a contact point or line of contact. Depressing bead 802 forces the two contact plates together completing or closing the circuit and allowing electricity to flow.

Figure 8B:
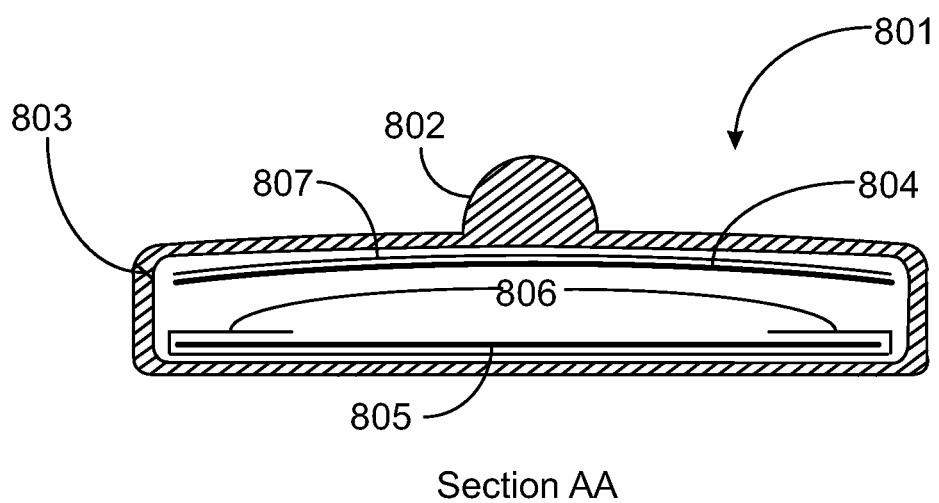
FIG. 8B is a sectioned view of the switch/sensor tape of FIG. 8A depicting a capacitive switch architecture that may be leveraged to activate one or more parts of the ladder use safety alert system of the invention.

FIG. 8B is a sectioned view of the switch/sensor tape 801 of FIG. 8A depicting a capacitive switch architecture that may be leveraged to activate one or more electrically powered parts of the ladder use safety alert system of the invention. Contact switch tape 801 includes a molded strip 803 that is contiguous with contact bead 802. Contact switch 801 includes a lower electrode contact plate 805 and an upper electrode contact plate 804. Upper contact plate 804 is arcuate and is separated from plate 805 by insulative material 806 preventing incidental contact between the plates. Upper contact plate 804 is insulated above with a polyethylene terephthalate (PET) film 807. Stepping down upon bead 802 forces contact plate 804 to contact plate 805 closing the circuit. In one embodiment, contact switch 801 may be used as a contact sensor or presence sensor and may be integrated with lead power tape in a wired embodiment.

In one embodiment, processing is distributed to peripheral Bluetooth devices that comprise the sensors, speakers, micro-controllers/memory, and an independent power source, wherein the device may be applied to a desired surface of a stepladder component using an adhesive and wherein the device may alert using LEDs, sound, and transmission of audio to another device over Bluetooth such as the ear piece of an operator. In another embodiment the processing is performed centrally as described relative to CPU 201 of FIG. 2 and sensors, LEDs and speakers (if used) may be powered by trace using lead tape and switch tape configurations that may be applied to desired surfaces of a ladder or stepladder. Variants of the system of the invention may be envisioned that use lights only or sound only without departing from the spirit and scope of the present invention.

Figure 9:
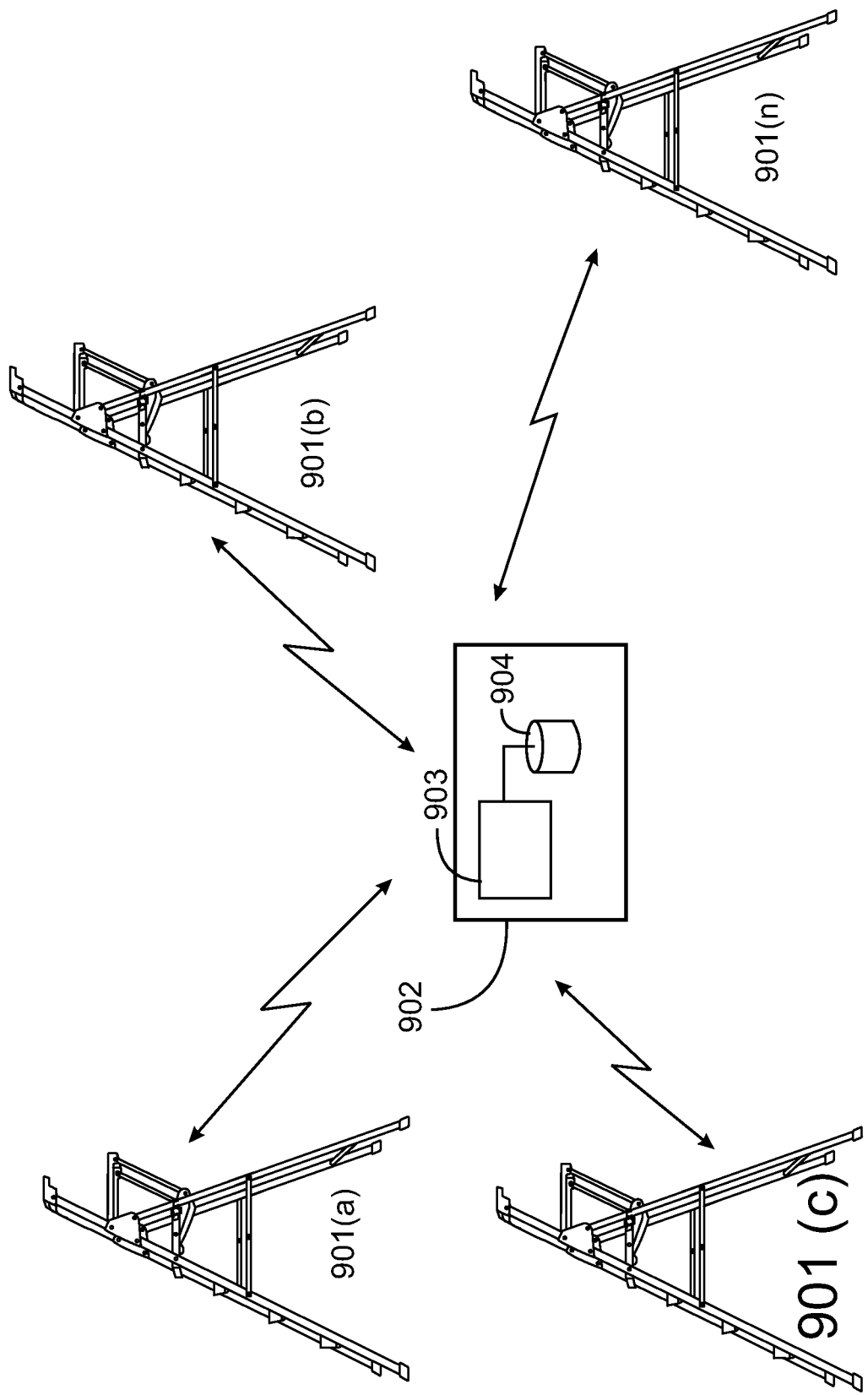
FIG. 9 illustrates a safety system comprising a plurality of structures and communication equipment.

FIG. 9 illustrates a system wherein a plurality of climbing devices, like ladder 101 of FIG. 1, electronically-enabled, may communicate with a central hub that may be monitored by a supervisor in a circumstance of a construction project, for example. It was described above that an electronically-enhanced ladder according to an embodiment of the invention might have wireless communication capability, and might transmit alerts to, for example, an earpiece worn by a person using the ladder. In one embodiment a plurality of devices, shown as ladders 901(1-n) might send alerts and other data to a central hub 902, having computerized circuitry 903 that may include a CPU, circuitry for wireless communication, and an ability to sort and store incoming data in a data repository 904.

Ladders 901(1-n) represent any number of electronically-enabled structures like ladders, stools, scaffolds and the like that might be used in a localized construction project, typically under supervision of a construction firm that may have craftsmen using the enabled structures, and managers and supervisors with a responsibility for safety in the workplace during various projects.

In one embodiment individual ones of ladders (or other structures) 901 may be assigned during a project to individual craftsmen in the employ of the construction firm. in one embodiment, the structures 901 may be enabled through a CPU and executable code to record each time a user performs an unsafe use of the structure and may be enabled to transmit such data to hub 902 where the data may be sorted and recorded by computerized circuitry 903. There may also be output protocol managed by circuitry 903 to provide a centralized visual or audible alert at the hub when notice of an unsafe use is received, and the output might also identify the craftsman having performed an unsafe use.

Further, circuitry 903 may sort and store the incoming data in repository 904 such that said data may be retrieved periodically and printed out, providing a historical record of safe and unsafe uses of the enabled structures on the job site, associated with the craftsman that were using the structures at the time. In some circumstances this record may be associated with persons (craftsmen) beyond just their association with a particular firm and may be used also by insurance and government agencies in calculating insurance rates and regulating performance of enterprises subject to government regulation.

Figure 10:
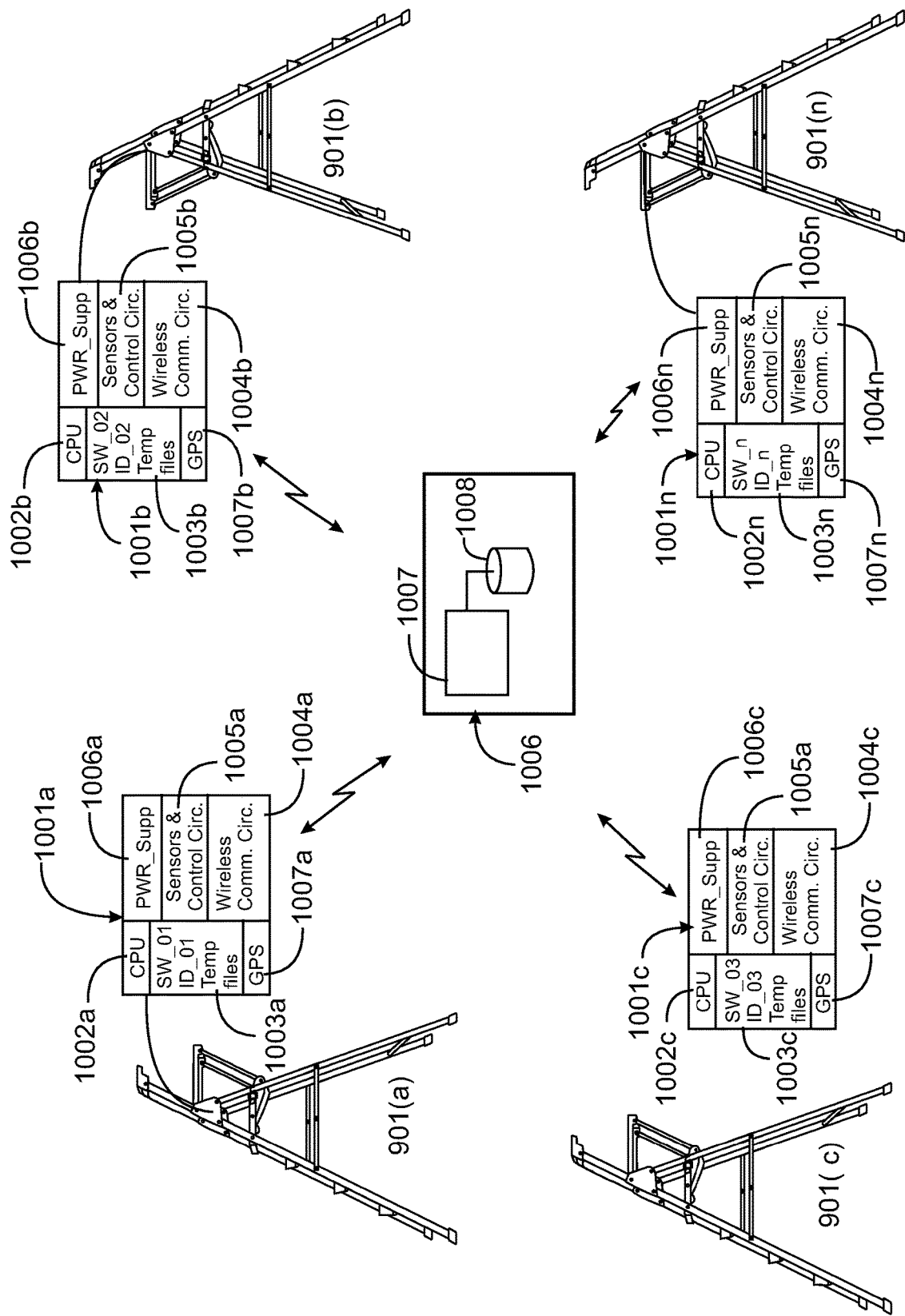
FIG. 10 is a diagram similar to FIG. 9 illustrating a system for monitoring tool use.

FIG. 10 is a diagram like FIG. 9 but adding detail and further functionality to the system described with reference to FIG. 9. In the system of FIG. 10 there are a plurality of ladders shown as 901a through 901n, each having circuitry 1001a through 1001n. The indication of ladders is exemplary, as the tools may be of a different nature, such as electric drills, impact hammers, extension ladders, tree-climbing harnesses, or a wide variety of other tools and devices that may be known to be usable in a safe manner or an unsafe manner, wherein unsafe use may be identified and determined by sensors of various sorts, and by processing at the tool, or at a central hub, by software executing algorithms adapted to determine safe and unsafe instances of use. So, FIG. 10 is an example using stepladders as described above having sensors and local circuitry.

The local circuitry at each stepladder 901a-n is identified as 1001a-n and is installed somewhere on the framework of the stepladder, or if not a stepladder, somewhere in or on the tool or device. Each instance of local circuitry includes at least a CPU 1002a-n, a digital memory 1003a-n, which memory may one of several sorts, such as hard disk, removable flash, or other known digital memory. The memory device may be termed a data repository, and may comprise executable software (SW), such as SW_01 at ladder 901(a). This SW may be installed at the time of installation of the circuitry to the ladder or other tool or may be downloaded from central hub 1006. SW may also be updated or replaced from time to time. Functionality of SW at the local circuitry is described in further enabling detail below.

Memory 1003a-n will also, in most embodiments, store a unique identification number shown as ID-01 for stepladder 901(A), ID_02 for stepladder 901(b), ID-03 for stepladder 901(c), and ID_n for stepladder 901(n). This number identifies the stepladder (or other tool) uniquely, so no two such tools will get mixed up, and makes it possible to assign each tool to a particular user, and to track the use of the tool (the activity, safe or unsafe, of the user). The memory device will also store temporary files in digital operations.

The circuitry at each exemplary stepladder has, in this example, a power supply 1006a-n, sensors and control circuitry 1005a-n and wireless communication circuitry 1004a-n. The wireless communication circuitry syncs with wireless communication circuitry in central hub 1006, as a part of circuitry 1007, and enables data sensed and determined at each ladder or other tool to be communicated to the central hub, where said data may be stored in various ways described below in data repository 1008.

In some embodiments control circuitry 1001a-n may also have GPS circuitry 1007a-n enabling location of the ladder or other tool at different times and uses are described more fully below.

Figure 11:
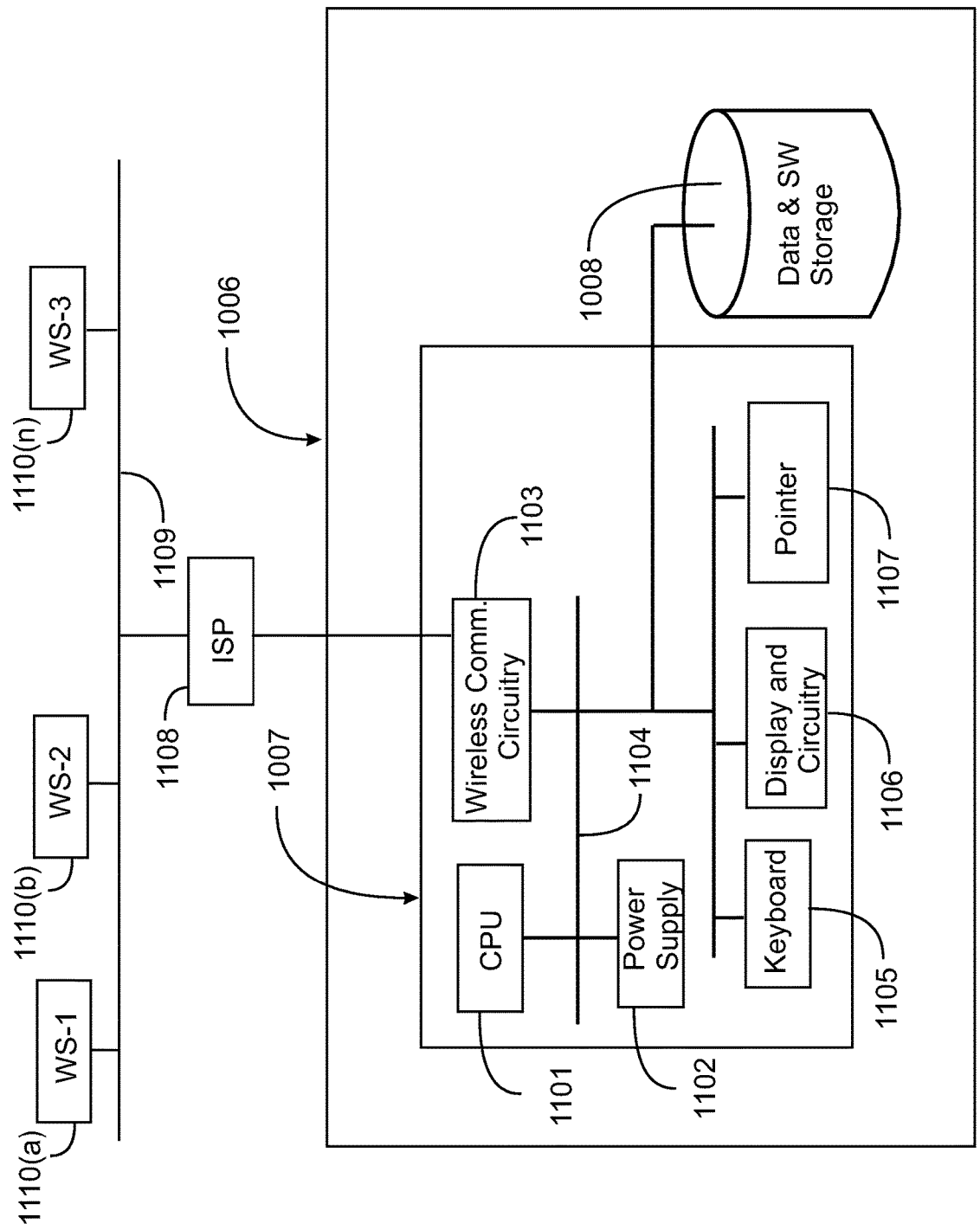
FIG. 11 is an expanded diagram of a central hub of FIG. 9 in one embodiment of the invention.

FIG. 11 is an expanded diagram of central hub 1006 in one embodiment of the invention. Central hub 1006 comprises, in this example, digital circuitry 1007, comprising a CPU 1101, which may be any one of several sorts as known in the art, a power supply 1102, which may be, in one embodiment, power from a conventional wall socket, transformed as necessary for electronic components, and wireless communication circuitry 1103, adapted to interact with wireless circuitry 1104a-n as seen in FIG. 9. The digital elements in hub 1006 are interconnected by a digital bus 1104.

Data repository 1008 is also connected by bus 1104 to CPU 1101 and other electronic components of hub 1006. In one embodiment hub 1006 may comprise a general-purpose computer system and peripheral devices. In one embodiment there may be a keyboard 1105, a pointer device 1107 and a display screen circuitry 1106.

In one embodiment of the invention communication circuitry 1103, and circuitry 1004a-n at individual tools may be Bluetooth™ protocol, but systems according to the invention are not so limited. In one embodiment communication circuitry 1103 at a central hub may comprise modem circuitry providing a local WiFi network. Such a wireless local area network has more range than does Bluetooth™.

In systems according to the invention, wherein a WiFi network is created for interconnecting tools in a local area, the modem may also provide Internet access, and the local hub will then be able to interact with servers and web sites in the Internet network. IN the circumstance wherein local communication is by, for example, Bluetooth™, the central hub may have access to the Internet through, for example, an Internet Service Provider (ISP) 1108, connecting to Internet backbone 1109, representing all of the interconnections in the Internet network, and thus to Internet-connected servers and websites (WS) represented by sites 1110(a-n), as WS-1 through WS-n.

As a use case example, ladders 901(a) through 901(n) in FIG. 10 may be manufactured by one national manufacturer, which may host a web site 1110(a) labeled WS-1. Instances of safe and unsafe use of each ladder may be tracked by central hub 1006, which may be hosted by a licensed drywall contractor, and a designated employee of the drywall contractor may, during a particular project, monitor the safe use of the ladders, and the activity of employees assigned to the particular ladders. Further, instances of use may also be transmitted to the ladder manufacturer at the manufacturer's website.

In another use case, both the contractor disbursing the ladders, and the manufacturer, or one or the other, may track location of the ladders. In one embodiment wireless communication circuitry 1004(a-n) may be cellular circuitry, and circuitry 1001 may, through execution of SW, periodically connect to the Internet through an ISP accessed through the cellular network, and report directly to a web site which may be the hosted by the ladder manufacturer or by a construction company. In this embodiment all ladders used by a particular company may have IP Addresses for the ID numbers, and the ladder circuitry is thus a part of the IoT.

The skilled person will understand that many sorts of tools may be digitized in ways taught in the figures and specification of this application. Each tool may, at minimum, have one or more sensors, and one or more output mechanisms, such that alerts may occur under certain circumstances. As a simple example, a drilling tool may have a force sensor, and digital circuitry adapted to present an alert signal if a user applies pressure to the drilling bit above a pre-programmed threshold.

In a somewhat more sophisticated scenario, the drilling tool may have GPS circuitry as well, and cellular circuitry, and in the event of unsafe use (the application of excessive pressure, may report the unsafe use to either or both of the tool manufacturer, or to a central hub hosted by a contractor company who has assigned the tools uniquely to certain employees.

Figure 12:
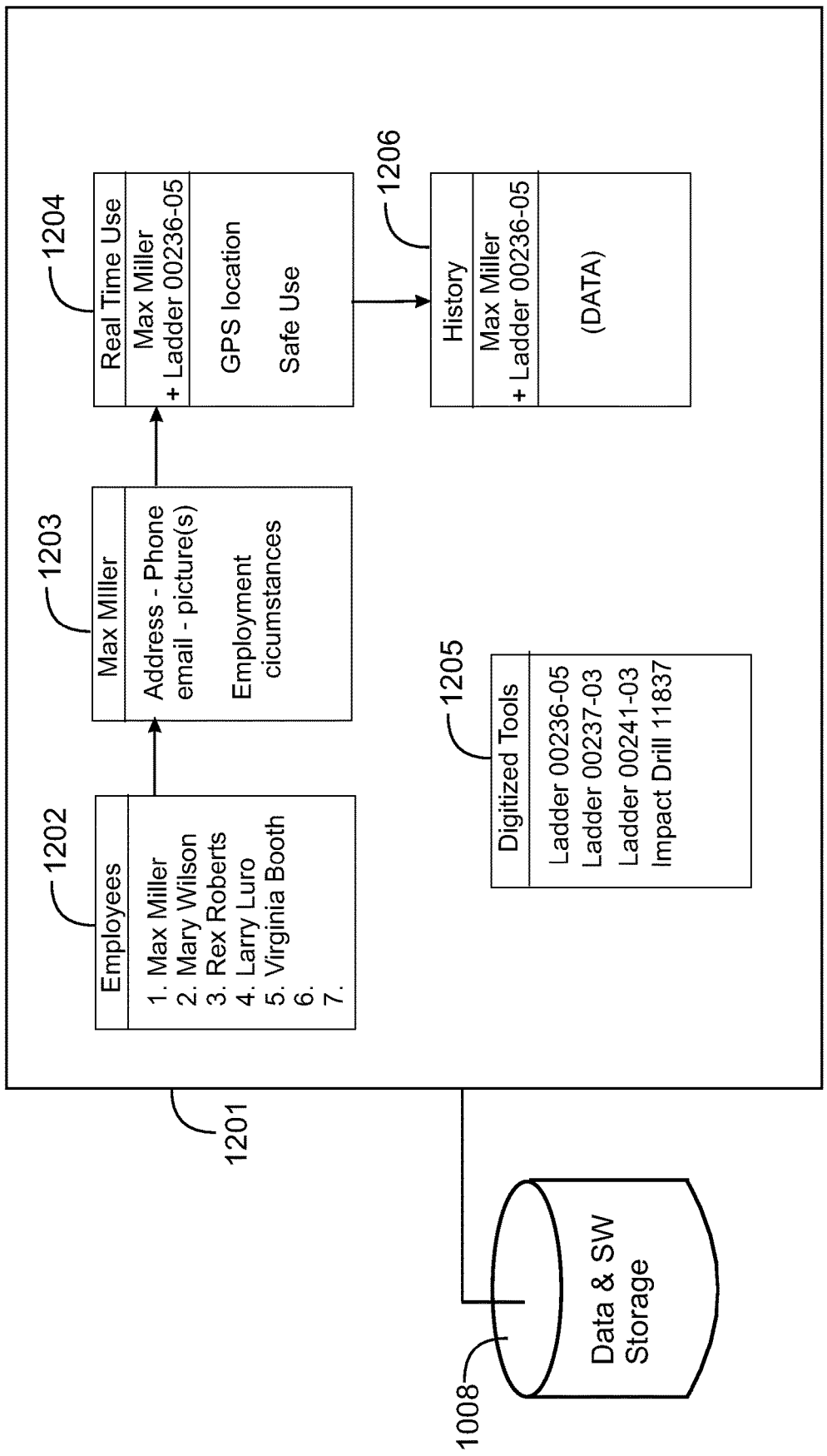
FIG. 12 is a diagram illustrating data files at the central hub of FIG. 11.

FIG. 12 is a diagram illustrating operations at a central hub 1006 by a contractor having assigned specific digitally-enhanced tools, such as ladders (for example) to specific employees. Diagram 1201 illustrates organized content (data) residing in data repository 1008 at a central hub 1006. File 1202 is a compilation of employees, including the employee's contact information, hiring circumstances, and other data that might be common to an employee profile. This data may be maintained by an authorized person and edited as circumstances require. File 1203 is a profile for a specific employee, Max Miller, and the data is the usual data for an employee profile. File 1204 is a dynamic file for data transmitted from the digital circuitry of ladder 00236-05 and reflects real-time GPS location and the right-now circumstance of safe or unsafe use.

File 1205 in FIG. 12 is data on digitized tools that are in use at the particular contractor hosting the hub with data repository 1008. Each tool has an ID number, and in some circumstances the ID number may be ab IP Address. File 1206 is a history of Max Miller's activity with ladder 00236-05, listing time-stamped data regarding safe and unsafe use.

The skilled person will understand that the illustration of FIG. 12 is exemplary, and that there are many ways that the data may be organized and accessed. Of particular importance is the pairing of specific employees with specific tools, and an ability to track the employee's use of the assigned tool as to instances of unsafe and safe use.

Referring back to FIG. 10, assume that employee Max Miller has been assigned to ladder 901(a), which may be assumed to be identified as ladder 00236-05. SW_01 executing on CPU 1002a tracks Max's activity with the stepladder through sensor input to CPU 1002a relative to time. SW_01 comprises algorithms that recognize a sequence of activity that may be unsafe. For example, ladder 901(a) may have sensors on each step of the ladder to sense Max stepping onto each step. If Max, for example, climbs the ladder one step at a time in one-half-second steps, an algorithm creates an "unsafe instance", which may be assigned an ID and may be time stamped. The real-time file 1204 may reflect "unsafe use" and an alert may be issued at the ladder (a beep for example), and also at the central hub, to alert a safety employee or supervisor of unsafe use. An instance of unsafe use may be saved in history file 1206 for Max.

The step rate is just one instance. Another may be that Max dismounts the ladder from the second, or even the third step. Another may be that Max steps on a step not meant to bear his weight, or a step too high to be safe. Each of these activities merits an "unsafe use" record.

The skilled person will understand that there may be many definitions of unsafe use for different tools under different circumstances, and that algorithms may be created and executed to monitor employee activity with individual digitized tools.

It will be apparent to one with skill in the art that the safety system of the invention may be provided using some or all the mentioned features and components described without departing from the spirit and scope of the invention. It will also be apparent to the skilled artisan that the embodiments described above are specific examples of a single broader invention which may have greater scope than any of the singular descriptions taught. There may be many alterations made in the descriptions without departing from the spirit and scope of the present invention. There may be many alterations made in the descriptions without departing from the spirit and scope of the present invention.

What is claimed is:

1. A tool use system, comprising:

a tool having sensors tracking use of the tool, a first CPU executing first coded instructions monitoring input from the sensors with respect to time; and first wireless communication circuitry adapted to transmit data; and a central hub comprising a second CPU executing second coded instructions, a data repository, and second wireless communication circuitry compatible with the first wireless communication circuitry;

wherein the first coded instructions comprise an algorithm adapted to identify an instance of unsafe use of the tool based on sensory input and time, and wherein an identified instance of unsafe use is transmitted by the first wireless communication circuitry to the second wireless communication circuitry, and the second coded instructions cause the instance of unsafe use to be recorded in the data repository.

2. The tool use system of claim 1, wherein the tool comprises an ID number stored at the tool, and the ID number and a time stamp are associated with the instance of unsafe use.

3. The tool use system of claim 2, wherein the tool is associated digitally at the central hub with a specific user, and the instance of unsafe use is recorded in the data repository associated digitally with the specific user.

4. The tool use system of claim 1, wherein the first and second wireless communication circuitry operate on compatible Bluetooth™ protocol.

5. The tool use system of claim 1, wherein, upon identifying an instance of unsafe use, an alert is issued at one or both of the tool and the central hub.

6. The tool use system of claim 1, wherein the second wireless communication circuitry comprises a modem creating a WiFi local network, and wherein the first wireless communication circuitry accesses the WiFi network.

7. The tool use system of claim 1, wherein the first wireless communication circuitry comprises access to a cellular network, and wherein the central hub is an Internet connected server system.

8. The tool use system of claim 1, wherein the tool has an IP Address stored at the tool, and the tool is accessible on the Internet through the IP address.

9. The tool use system of claim 1, wherein the tool further comprises GPS circuitry wherein GPS location is transmitted by the first wireless communication circuitry.

10. The tool use system of claim 3, wherein the central hub further comprises a keyboard and a display screen with supporting circuitry, providing access by an authorized person to data stored in the data repository.

11. The tool use system of claim 10, wherein the authorized person is enabled through the second coded instructions to create and edit files and associations in the data repository.

12. A tool use system comprising:

a tool having sensors tracking use of the tool, a first CPU executing first coded instructions monitoring input from the sensors with respect to time; wireless communication circuitry, a first data repository, and an IP address stored at the tool; and an Internet-connected domain comprising a second CPU executing second coded instructions, and a second data repository;

wherein the Internet-connected domain establishes communication with the tool and accesses data stored in the first data repository.

13. The tool use system of claim 12, wherein the first coded instructions comprise an algorithm adapted to identify an instance of unsafe use of the tool based on sensory input and time, and wherein an identified instance of unsafe use is recorded in the first data repository, and wherein the data accessed by the Internet-connected domain comprises the stored instance of unsafe use.

14. The tool use system of claim 12, further comprising a plurality of tools each comprising sensors tracking use of the tool, a first CPU executing first coded instructions monitoring input from the sensors with respect to time; wireless communication circuitry, a first data repository, and an IP address stored at the tool, wherein each of the plurality of tools has a unique IP address identifying the specific tool, and a host of the Internet-connected domain is enabled to track unsafe use of each of the tools.

* * * * *